United States Patent [19]
Rosenberg et al.

[11] Patent Number: 5,628,531
[45] Date of Patent: May 13, 1997

[54] QUICK CONNECTOR WITH SECONDARY LATCH

[75] Inventors: Andrew Rosenberg, Almont; Richard Pepe, Macomb, both of Mich.

[73] Assignee: Bundy Corporation, Warren, Mich.

[21] Appl. No.: 429,317

[22] Filed: Apr. 26, 1995

[51] Int. Cl.⁶ .................................................. F16L 35/00
[52] U.S. Cl. ............................. 285/81; 285/87; 285/320; 285/319
[58] Field of Search .......................... 285/81, 320, 319, 285/87, 312

[56] References Cited

U.S. PATENT DOCUMENTS

| | | |
|---|---|---|
| 833,408 | 10/1906 | McCann . |
| 923,370 | 7/1909 | Feickert . |
| 964,238 | 7/1910 | Goss . |
| 1,926,949 | 9/1933 | Kennedy ................... 284/320 |
| 2,281,633 | 1/1942 | Stitzer . |
| 2,643,138 | 6/1953 | Jacobs ...................... 285/320 |
| 2,889,157 | 6/1959 | Kolbe ....................... 281/320 |
| 3,146,011 | 8/1964 | Stevens . |
| 3,155,402 | 11/1964 | Lornelius ................. 285/320 |
| 3,278,205 | 10/1966 | Barlow . |
| 3,394,950 | 7/1968 | Jensen . |
| 3,574,992 | 4/1971 | Swanson ................... 292/247 |
| 4,035,005 | 7/1977 | DeVincent et al. . |
| 4,068,870 | 1/1978 | Whitney et al. . |
| 4,392,836 | 7/1983 | Sugawana ................ 285/320 |
| 4,730,856 | 3/1988 | Washizu . |
| 4,781,400 | 11/1988 | Cunningham . |
| 4,875,715 | 10/1989 | Dennany, Jr. et al. . |
| 5,069,424 | 12/1991 | Dennany, Jr. et al. . |
| 5,123,677 | 6/1992 | Krecko et al. . |
| 5,303,963 | 4/1994 | McNaughton et al. . |
| 5,360,237 | 11/1994 | Carmen et al. . |
| 5,395,140 | 3/1995 | Wiethron . |
| 5,401,063 | 3/1995 | Plosz . |
| 5,447,337 | 9/1995 | Ruckwardt ............... 285/320 |
| 5,496,074 | 3/1996 | Viratelle et al. .......... 281/320 |

FOREIGN PATENT DOCUMENTS

| | | | |
|---|---|---|---|
| 648695 | 4/1937 | Germany ................. | 285/320 |
| 2091365 | 7/1968 | United Kingdom . | |

Primary Examiner—Eric K. Nicholson
Attorney, Agent, or Firm—Dorn, McEachran, Jambor & Keating

[57] ABSTRACT

A quick connector coupling includes a hollow female connector body having a plurality of slots formed therethrough to define a plurality of radial ledges. A male member received in the connector body has an enlarged annular upset. A retainer disposed in the connector body includes locking beams extending between the upset and the radial ledges to secure the male member in the connector body. A latch is hinged about two posts formed on the exterior of the connector body. The latch includes a main body portion extending between a front edge and a rear edge. Legs depending from sides of the latch adjacent the rear edge are mounted over the posts. A latching beam depending from the front edge of the latch enters one of the slots formed in the connector body and is positioned between a radial ledge and the upset to further secure the male member in the connector body. Catch beams depending from sides of the latch adjacent the front edge cam against the outer surface of the connector body and snap into side slots, locking the latch into place.

14 Claims, 2 Drawing Sheets

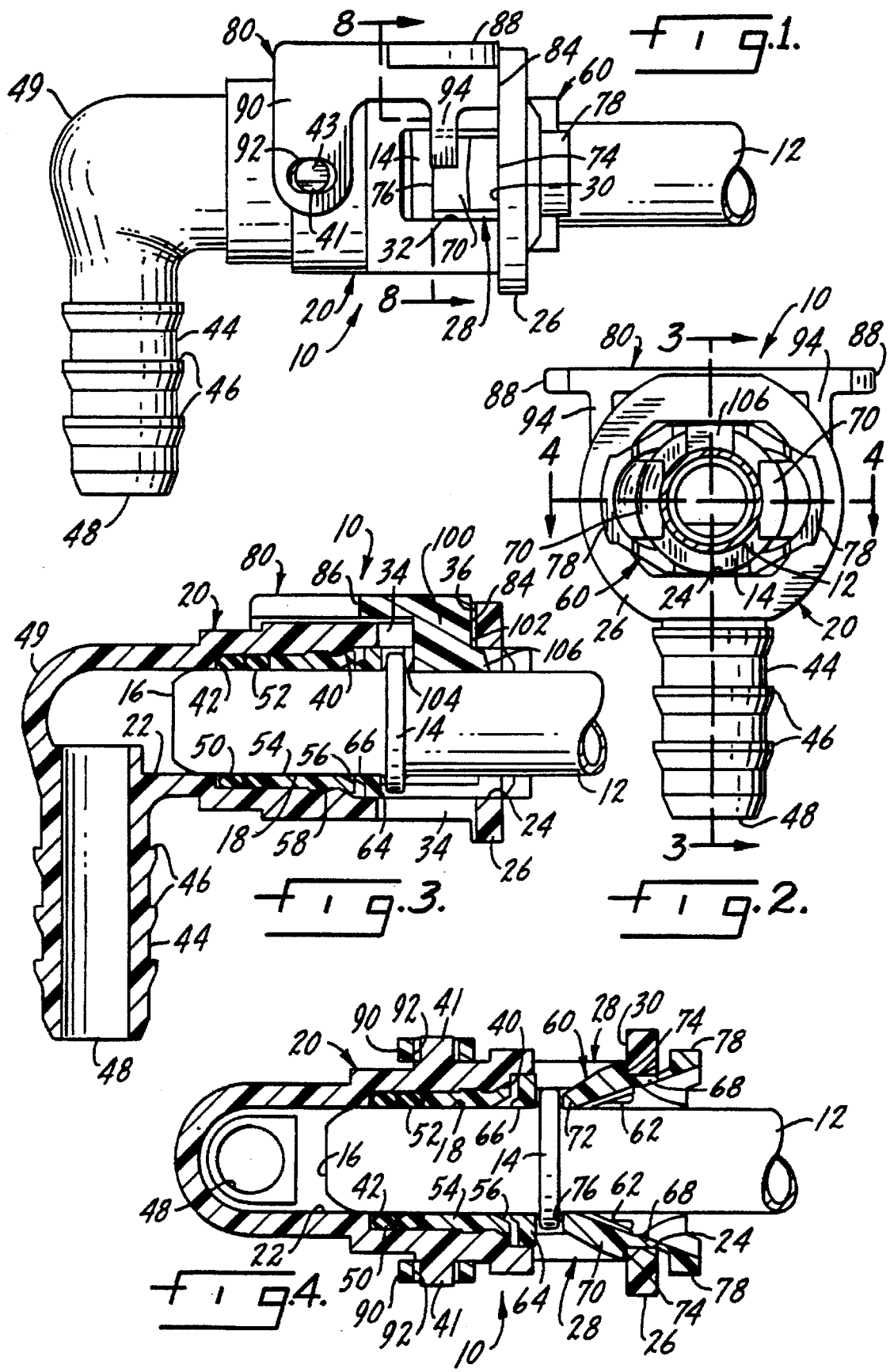

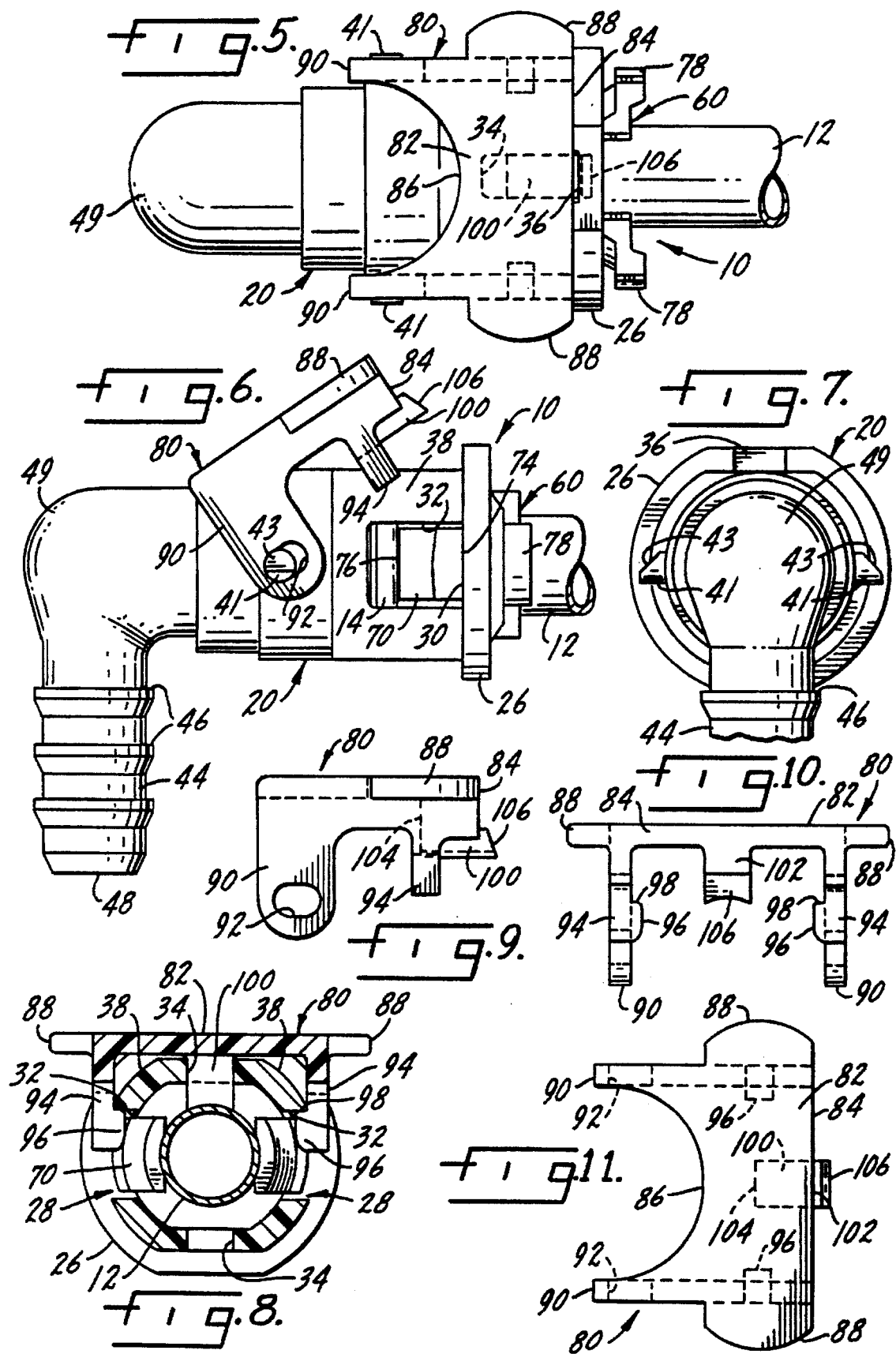

5,628,531

QUICK CONNECTOR WITH SECONDARY LATCH

BACKGROUND OF THE INVENTION

This invention relates to fluid line systems which include quick connector couplings, and more particularly to a secondary latch which reduces the chances of accidental disconnection of the coupling.

In automotive and other fields, quick connector couplings, which generally include a male member received and sealingly retained in a female connector body, are often utilized to provide a fluid connection between two components or conduits, thus establishing a fluid line between the two components. Use of quick connector couplings is advantageous in that a sealed and secured fluid line may be established with a minimum amount of time and expense.

A retainer, usually housed within the female connector body, is used to secure the male member within the connector body. One such type of retainer includes a plurality of locking beams which extend between a radial upset formed on the male member and a radial face defined in the connector body, preventing withdrawal of the male member from the connector body. This type of retainer is prevalent in the art and has proven effective in many fluid line applications.

Nevertheless, such retainers have occasionally been prone to failure. To protect against disconnection or unsealing of the coupling as a result of retainer failure, secondary or back-up latches have sometimes been utilized. Previous secondary latches, however, have not proven altogether effective. Problems experienced include difficulty in connection, lack of strength and lack of a clear indication of whether the secondary latch has been latched properly.

The present invention provides a secondary latch for a quick connector which overcomes these deficiencies.

SUMMARY OF THE INVENTION

The present invention provides an easily connectable secondary latch for a quick connector coupling which is capable of withstanding large loads and which provides a clear indication of whether or not it has been properly latched.

Accordingly, the coupling is comprised of a hollow female connector body having a plurality of slots formed therethrough to define a plurality of radial ledges. Hinge means are formed on an exterior surface of the connector body.

A male member is received in the connector body and has an enlarged annular upset. A retainer disposed in the connector body includes locking beams which extend between the upset and the radial ledges to secure the male member in the connector body.

A latch is attached to the hinge means on the exterior of the connector body. The latch is movable to a latched position wherein a latching beam extends through one of the slots formed in the connector body and is positioned between one of the ledges and the male member upset to further secure the male member in the connector body.

BRIEF DESCRIPTION OF THE DRAWINGS

FIG. 1 is a side view of a quick connector coupling according to the present invention showing a secondary latch in a latched position;

FIG. 2 is a front view of the latched coupling;

FIG. 3 is a partial sectional view of the latched coupling taken through lines 3—3 of FIG. 2;

FIG. 4 is a partial sectional view of the latched coupling taken through lines 4—4 of FIG. 2;

FIG. 5 is a top plan view of the latched coupling;

FIG. 6 is a side view of the coupling showing the secondary latch in an unlatched position;

FIG. 7 is a rear view of the female connector body of the coupling with the secondary latch completely removed;

FIG. 8 is a sectional view of a latched coupling taken through lines 8—8 of FIG. 1;

FIG. 9 is a side view of the secondary latch;

FIG. 10 is a front view of the secondary latch; and

FIG. 11 a top plan view of the secondary latch.

DETAILED DESCRIPTION OF THE INVENTION

A quick connector coupling according to the present invention is illustrated in FIGS. 1–8. Quick connector coupling 10 includes a male member 12 connectable with a hollow female connector body 20 to form a permanent, but severable joint in a fluid line system.

Male member 12 is formed at an end of a hollow, rigid tube which forms a part of a fluid line system. The tube on which male member 12 is formed may lead to a component in a fluid line system, or may itself be a component in a fluid line system. Male member 12 includes an annular flange or upset 14 formed a given distance from an open end 16. End 16 is rounded or tapered to facilitate insertion of male member 12 into connector body 20. A smooth, cylindrical sealing surface 18 extends between upset 14 and tube end 16. The outer diameter of sealing surface 18 is such that male member 12 fits snugly within connector body 20.

Female connector body 20 is hollow and defines a bore 22. It is made of a plastic material; preferably nylon 12 (unfilled). An enlarged retainer housing portion of bore 22 is formed at an end of connector body 20 having an entrance 24 defined by a radial annular rim 26. A pair of one-hundred eighty (180) degree circumferentially displaced, rectangular windows 28 are formed through connector body 20 and extend from rim 26 away from entrance 24. Windows 28 define radial window ledges 30 facing away from rim 26, and axial catch surfaces 32 extending away from rim 26, the purposes of which will be described herein.

A slot 34 is formed through the retainer housing portion of connector body 20. Slot 34 is narrower than, and is circumferentially spaced ninety (90) degrees from, windows 28. The positioning of slot 34 relative to windows 28 is best seen in FIG. 8. Slot 34 defines a radial slot ledge 36 facing away from rim 26, the purpose of which will be described herein. Slot ledge 36 is best seen in FIG. 3. Curved cam surfaces 38 extend circumferentially between slot 34 and windows 28.

Connector body bore 22 further includes a seal housing portion. The seal housing portion is of reduced diameter relative to the retainer housing portion and extends between a conical shoulder 40 adjacent the retainer housing portion and a radial shoulder 42 remote from the retainer housing portion. Two cylindrical mounting posts 41 are formed on opposite sides of the exterior of connector body 20 at an axial position between shoulders 40 and 42. A chamfered surface 43 is formed on each post 41 (best seen in FIG. 7).

Tubing connection stem 44 is formed at an end of connector body 20 remote from entrance 24. Barbs 46 are formed in the exterior of stem 44 to facilitate connection to flexible tubing (not shown). An open end 48 provides communication with the flexible tubing. Stem 44 is offset ninety degrees relative to the retainer and seal housing portions of connector body 20 due to an elbow or bend 49 formed in connector body 20. Stem 44 could be configured in alternative ways for connection to other system arrangements. For example, rather than being bent at a ninety degree angle, stem 44 could be formed in axial alignment with the rest of connector body 20. Or, if connector body 20 were metal, threads could be formed in the exterior of stem 44, rather than barbs, to permit threaded connection within a mating system component.

Disposed within the seal housing portion of connector body 20 are an inner O-ring seal 50 and an outer O-ring seal 52. Though not shown in the drawings, O-rings 50 and 52 may be separated by a spacer ring if desired. Preferably, inner O-ring 50 is a fluorocarbon/fluorosilicone blend and outer O-ring 52 is fluorosilicone. The O-rings should be sized to fit tightly within bore 22 and tightly around sealing surface 18 of male member 12.

O-rings 50 and 52 are positioned and secured in bore 22 by spacer sleeve 54. Spacer sleeve 54 has a conically enlarged end 56 which seats against conical shoulder 40 formed in the interior of connector body 20, positioning sleeve 54 within bore 22. Spacer sleeve 54 is made of a rigid plastic material; preferably nylon 12 (23% glass-filled). To provide enhanced securement of spacer sleeve 54 within bore 22, a raised annular portion 58 is formed in the outer periphery of sleeve 54, and a corresponding annular recess formed in the connector body interior wall. Raised spacer portion 58 is matingly received in the recess formed in the interior wall to lock sleeve 54 into place.

Spacer sleeve 54 performs several important functions. It retains O-rings 50 and 52 within bore 22 in a relatively fixed position and prevents their escape from bore 22. Also, the inner diameter of sleeve 54 approximates the outer diameter of male member 12, minimizing potentially debilitating radial movement of male member 12 relative to connector body 20. Finally, spacer sleeve 54 limits inward movement of retainer 60 (described below), which, in turn, limits inward movement of male member 12.

A retainer 60 disposed in the retainer housing portion of connector body 20 adjacent entrance 24 secures male member 12 within connector body 20. Retainer 60 is made of plastic, preferably nylon 6–12. It is comprised of two retention beam support structures 62 extending outward from a base ring 64.

Base ring 64 is positioned immediately outward of spacer sleeve 54. It has a central annular opening with a diameter slightly greater than the outer diameter of male member cylindrical sealing surface 18, but less than the diameter of male member upset 14. Thus, sealing surface 18 can pass through base ring 64, but upset 14 cannot. Abutment of base ring 64 against sleeve 54 limits inward movement of retainer 60. Since male member upset 14 cannot pass through base ring 64, the contact between base ring 64 and sleeve 54 ultimately establishes a maximum limit to insertion of male member 12 into connector body 20.

A relatively short annular flange 66 extends inward from the inner periphery of base ring 64. The recess defined by conically enlarged end 56 of spacer sleeve 54 receives flange 66 when base ring 64 is pressed against sleeve 54. Flange 66 has an inner diameter approximating the outer diameter of male member sealing surface 18, providing radial stability of base ring 64 about male member 12.

Retention beam support structures 62 are integrally joined to, and extend outward from, base ring 64. Each support structure 62 includes two parallel support beams extending from base ring 64 towards entrance 24. The support beams are joined at their ends distal from base ring 64 by semi-circular cross beams 68. Cross beams 68 are nested within the interior of entrance rim 26, positioning retainer 60 relative to connector body 20. The radial spacing between cross beams 68 is slightly greater than the outside diameter of upset 14. Hence, male member 12, upset 14 and all, can pass between cross beams 68 without resistance.

A retention beam 70 is centrally mounted on each cross beam 68, straddled by the support beams of support structure 62. Retention beams 70 extend inwardly from cross beams 68 at a converging angle, terminating in free ends 72. The axial separation between free ends 72 and base ring 64 must be at least as great as the axial width of upset 14.

Immediately adjacent cross beams 68, locking beams 70 have an inside separation equal to the separation between beams 68. Moving towards free ends 72, the separation between beams 70 steadily decreases. That is, the inside peripheral surfaces of beams 70 extend radially inwardly in a direction from cross beams 68 towards free ends 72. The radial spacing between free ends 72 is less than the diameter of male member upset 14. Thus, retention beams 70 must be forced radially outwardly to permit passage of upset 14.

Each retention beam 70 is formed with two radial locking surfaces. Outwardly facing locking surfaces 74 are formed adjacent, and above, the points of attachment of retention beams 70 to cross beams 68. Locking surfaces 74 engage window ledges 30 to prevent withdrawal of retainer 60 from bore 22. Inwardly facing locking surfaces 76 are formed at the free ends 72 of retention beams 70. Locking surfaces 76 engage upset 14, after upset 14 has moved inward of free ends 72, to prevent withdrawal of male member 12 from bore 22.

Finger release tabs 78 extend from cross beams 68 at locations directly opposite locking beams 70. When installed, release tabs 78 extend outside of connector body 20. When release tabs 78 are compressed or squeezed towards each other support structures 62 and hence, locking beams 70, move towards each other. Eventually, locking surfaces 74 disengage window ledges 30 to permit removal of male member 12 and retainer 60 from connector body 20.

Secondary latch 80 is attached to the exterior of connector body 20. Latch 80, illustrated in detail in FIGS. 9–11, is made of a plastic such as nylon 12 (23% glass-filled). It should be understood that although latch 80 is referred to as "secondary" and shown in conjunction with another retainer, applications are envisioned in which it would be possible or even preferable to utilize latch 80 alone, without another "primary" retainer. Applications in which relatively low loads are encountered are an example.

Latch 80 includes a main body portion 82 extending between a front edge 84 and a semi-circular rear edge 86. Two finger tabs 88 extend from the side edges of body portion 82 adjacent front edge 84. Two legs 90 depend from the side edges of body portion 82 adjacent rear edge 86. Oblong holes 92 are formed through the ends of legs 90 to receive posts 41 formed on connector body 20. Between legs 90 and front edge 84 two opposing catch beams 94 depend from the main body side edges. Catch beams 94 depend from main body 82 a lesser amount than do legs 90. Inwardly-extending lobes 96 at the ends of catch beams 94 define catch edges 98 (which face main body portion 82).

Adjacent front edge 84 of secondary latch 80 and at a point centered between the side edges, a rectangular latching beam 100 depends from the underside of main body portion 82. Latching beam 100 defines an outward facing latching surface 102 adjacent front edge 84 and an inward facing latching surface 104 remote from front edge 84. A short hook 106 extends forward of front edge 84 from the bottom of latching surface 102.

Prior to insertion of male member 12, retainer 60 and secondary latch must be assembled into and onto, respectively, connector body 20. These components may be assembled in any order.

In installing retainer 60, since the outside diameter of locking beams 70 exceeds the inside diameter of rim 26 over a portion of their length, beams 70 must be flexed inwardly to clear rim 26. This flexure is facilitated as the sloped outer surfaces of beams 70 slide or cam against rim 26 during insertion of the retainer. Release tabs 78 may also be utilized to assist in the clearance of beams 70. Once beams 70 clear rim 26, outwardly facing locking surfaces 74 snap behind and engage window ledges 30 to secure retainer 60 in connector body 20. In this installed position, cross beams 68 are seated inside rim 26, and base ring 64 is positioned adjacent spacer sleeve 54.

Secondary latch 80 is installed by straddling legs 90 around the exterior of connector body 20 and mounting oblong holes 92 around posts 41. The spacing between legs 90 is approximately equal to the exterior diameter of that portion of connector body 20. To fit legs 90 over posts 41, then, legs 90 must be flexed outward a bit. The chamfered surfaces 43 on posts 41 assist in this endeavor.

Once legs 90 have been fit over posts 41, secondary latch 80 becomes hinged onto and can swing about connector body 20 (see FIG. 6). The oblong shape of holes 92 also permits latch 80 to slide axially back and forth a slight amount relative to connector body 20. The semi-circular rear edge 86 of latch 80 matches the cylindrical exterior of connector body 20, allowing latch body 82 to rest against connector body 20 in a perpendicular position relative to the central axis of the retainer and seal housing portions of connector body 20.

Once retainer 60 and secondary latch 90 (as well as the seal elements) have been installed in this manner, insertion of male member 12 may proceed. Assembly of coupling 10 includes two steps: an initial locking step, in which male member 12 is moved inwardly, or inserted, to a locked position; and a secondary latching step, in which secondary latch 80 is moved to a latched position.

Resistance to insertion of male member 12 occurs when upset 14 contacts the radially inner surfaces of retainer locking beams 70. Since beams 70 are flexible about cross beams 68, impartment of sufficient inward force to male member 12 causes their outward flexure, and moves upset 14 inward of free ends 72 of beams 70. Once this occurs, beams 70 relax and inward facing locking surfaces 76 "snap" into place behind upset 14. As beams 70 now extend between upset 14 and window ledges 30, subsequent withdrawal of male member 12 from connector body 20 is prevented. Male member 12 is in a initial locked position. In this position, O-rings 50 and 52 form a fluid seal between sealing surface 18 of male member 12 and the interior of connector body 20.

Next, secondary latch 80 is moved to a latched position. Latch 80 is swung about its hinge on posts 41 until lobes 96 of catch beams 94 come into contact with the curved cam surfaces 38 formed on the exterior of connector body 20 between windows 28 and slot 34. The spacing between lobes 96 is less than the diameter of connector body 20 at the area of contact. Thus, pressure must be applied to the topside of main body portion 82 of latch 80 to cause lobes 96 to cam against cam surfaces 38 and spread catch beams 94 outwardly. If sufficient pressure is applied, lobes 96 enter windows 28 and catch edges 98 engage axial catch surfaces 32 to hold latch 80 in position.

If lobes 96 are not pushed to a point where catch edges 98 lock into place, lobes 96 act against cam surfaces 38 and cause catch beams 94 and latch 80 to spring upwardly into an unlatched position as soon as the operator releases the latch. Hence, an obvious indication that the secondary latch has not been moved to its fully latched position is provided.

At the same time lobes 96 are entering windows 28, latching beam 100 enters axially extending slot 34 formed in connector body 20. As best seen in FIG. 3, outwardly facing latching edge 102 engages slot ledge 36 and inwardly facing latching edge 104 engages upset 14 to provide a secondary means preventing withdrawal of male member 12 (in addition to retainer locking beams 70). Also, hook 106 extends underneath rim 26 slightly, which assists lobes 96 in preventing latch 80 from vibrating out of a latched position.

Until a load is applied, latch 80 may be slightly movable relative to male member 12 due to the oblong shape of holes 92 in legs 90. Once a load is applied and male member 12 is pulled outward, however, posts 41 slide through holes 92 until latching beam 100 is immovably entrapped between upset 14 and slot ledge 36. Latching beam 100 extends in a plane parallel to the central axis of male member 12 and is perpendicular to ledge 36 and upset 14. For failure of latch 80 to occur in this position, either slot ledge 36 (rim 26) or latching beam 100 would have to be crushed.

At least a portion of latching beam 100 is in actual contact with male member 12. Hence, a conductive ground path is formed between male member 12 and connector body 20 (which contacts latch 80 at leg 90 and catch beam 94) to prevent electrostatic discharge. If electrostatic discharge is a concern, connector body 20 and secondary latch 80 should be formed of dissipative plastic.

To release male member 12 from connector body 20, secondary latch 80 must first be unlatched. Finger tabs 88 on the sides of main body portion 82 of latch 80 may be gripped and pulled to help spread catch beams 94 until lobes 96 clear catch surfaces 32. Then, latch 80 springs back to an unlatched position. Next, release tabs 78 are squeezed to disengage retainer 60 from connector body 20, and male member 12 may be withdrawn.

Various features of the present invention have been explained with reference to the embodiment shown and described. It should be understood, however, that modification may be made without departing from the spirit and scope of the invention as represented by the following claims.

We claim:

1. A quick connector coupling comprising:

a hollow female connector body having a plurality of slots formed therethrough to define a plurality of radial ledges, and hinge means formed on an exterior surface of said connector body;

a male member received in said connector body and having an enlarged annular upset;

a retainer disposed in said connector body and including locking beams extending between said upset and said radial ledges to secure said male member in said connector body; and a latch attached to said hinge means and including latching means, said latch being movable to a latched position wherein said latching means extends through one of said slots and is positioned between one of said ledges and said upset to further secure said male member in said connector body, said latch further including at least one catch beam extending through another of said slots, said catch beams defining catch edges which engage catch surfaces defined by said another of said slots to secure said latch in said latched position.

2. A quick connector coupling as claimed in claim 1 wherein said latching means is a latching beam offset circumferentially ninety degrees from said locking beams of said retainer.

3. A quick connector coupling as claimed in claim 1 wherein said coupling includes means to repel said latching means away from said connector body if said latch is not fully moved to a latched position.

4. A quick connector coupling comprising:

a hollow female connector body having slots formed therethrough to define at least one radial ledge, and hinge means formed on a exterior surface;

a male member received in said connector body and having an enlarged annular upset; and a latch attached to said hinge means and including latching means, said latch being movable to a latched position wherein said latching means extends through a first slot and is positioned between said at least one radial ledge and said upset to prevent removal of said male member from said connector body, said latch further including catch beams which extend through second and third slots, said catch beams defining catch edges which engage catch surfaces defined by said second and third slots to secure said latch in said latched position.

5. A quick connector coupling as claimed in claim 4 wherein said hinge means comprise two posts formed on opposite sides of said connector body, and said latch further comprises two legs straddled about said connector body and mounted on said posts.

6. A quick connector coupling as claimed in claim 4, wherein there are three of said slots formed through said connector body.

7. A quick connector coupling as claimed in claim 4 wherein said connector body further comprises curved exterior cam surfaces, said catch beams contacting said cam surfaces and spreading apart during movement of said latch towards a latched position, said contact between said catch beams and said cam surfaces causing said latch to spring to an unlatched position if said latch is released before having been fully moved to said latched position.

8. A quick connector coupling as claimed in claim 4 wherein said latch further comprises a main body portion extending between a front edge and a semi-circular rear edge, said legs depending from sides of said main body portion adjacent said rear edge to mount said posts, said catch beams extending from sides of said main body portion adjacent said front edge, and said latching means extending from a central portion of said front edge.

9. A quick connector coupling comprising:

a hollow female connector body having hinge means formed on an exterior surface;

a male member received in said connector body and having an enlarged annular upset; and a latch attached to said hinge means and being movable to a latched position wherein a latching beam extends through a first slot formed in said connector body and is positioned between a radial ledge defined by said first slot and said upset to secure said male member in said connector body, and first and second catch beams extend through second and third slots in said connector body and engage catch edges defined by said second and third slots to secure said latch in said latched position.

10. A quick connector coupling as claimed in claim 9 wherein said coupling further comprises means to repel said latch to a clearly unlatched position if it has not been fully moved to a latched position.

11. A quick connector coupling as claimed in claim 10 wherein said means to repel said latch comprise exterior cam surfaces formed on said connector body which cooperate with catch beams depending from said latch.

12. A quick connector coupling as claimed in claim 9 wherein said hinge means comprise posts formed on opposite sides of said connector body, and said latch comprises legs which straddle said connector body and include holes which receive said posts.

13. A quick connector coupling as claimed in claim 12 wherein said posts are generally cylindrical in shape and include cammed portions to assist in installing said legs over said posts.

14. A quick connector coupling as claimed in claim 13 wherein said holes in said legs are of oblong shape, permitting said legs to both rotate about said posts and move axially relative to said posts.

* * * * *